(12) United States Patent
Lewis et al.

(10) Patent No.: US 7,054,813 B2
(45) Date of Patent: May 30, 2006

(54) AUTOMATIC GENERATION OF EFFICIENT GRAMMAR FOR HEADING SELECTION

(75) Inventors: James R. Lewis, Delray Beach, FL (US); Melanie D. Polkosky, Tampa, FL (US); Wallace J. Sadowski, Jr., Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/086,359

(22) Filed: Mar. 1, 2002

(65) Prior Publication Data

US 2003/0167168 A1 Sep. 4, 2003

(51) Int. Cl.
G10L 15/04 (2006.01)
G10L 15/00 (2006.01)
G10L 15/06 (2006.01)

(52) U.S. Cl. ............. 704/251; 704/252; 704/254; 704/231; 704/243

(58) Field of Classification Search ............ 704/251, 704/252, 257, 7, 10, 275, 270, 254, 231, 704/243
See application file for complete search history.

(56) References Cited

U.S. PATENT DOCUMENTS

| | | | | |
|---|---|---|---|---|
| 5,677,990 | A | 10/1997 | Junqua | 395/2.64 |
| 5,915,001 | A * | 6/1999 | Uppaluru | 704/270.1 |
| 5,991,720 | A | 11/1999 | Galler et al. | 704/256 |
| 5,995,918 | A | 11/1999 | Kendall et al. | 704/1 |
| 6,016,470 | A | 1/2000 | Shu | 704/244 |
| 6,038,573 | A * | 3/2000 | Parks | 715/513 |
| 6,078,886 | A | 6/2000 | Dragosh et al. | 704/270 |
| 6,212,498 | B1 | 4/2001 | Sherwood et al. | 704/244 |
| 6,587,822 | B1 * | 7/2003 | Brown et al. | 704/251 |
| 6,604,075 | B1 * | 8/2003 | Brown et al. | 704/270.1 |
| 6,658,414 | B1 * | 12/2003 | Bryan et al. | 704/270 |
| 6,675,159 | B1 * | 1/2004 | Lin et al. | 704/257 |
| 6,684,183 | B1 * | 1/2004 | Korall et al. | 704/257 |
| 6,760,695 | B1 * | 7/2004 | Kuno et al. | 704/9 |
| 6,804,330 | B1 * | 10/2004 | Jones et al. | 704/257 |
| 2002/0010715 | A1 * | 1/2002 | Chinn et al. | 707/514 |
| 2002/0032564 | A1 * | 3/2002 | Ehsani et al. | 704/235 |
| 2002/0146015 | A1 * | 10/2002 | Bryan et al. | 370/401 |
| 2003/0078781 | A1 * | 4/2003 | Julia et al. | 704/270.1 |

FOREIGN PATENT DOCUMENTS

| | | |
|---|---|---|
| EP | 1030248 | 8/2000 |
| JP | 08-030291 | 2/1996 |
| JP | 10-074207 | 3/1998 |
| WO | WO 00/65814 | 11/2000 |

* cited by examiner

*Primary Examiner*—Vijay Chawan
*Assistant Examiner*—Thomas E. Shortledge
(74) *Attorney, Agent, or Firm*—Akerman Senterfitt

(57) ABSTRACT

A method of generating a grammar for recognizing headings in a speech recognition system can include identifying, within a data store, at least one heading selection associated with a content item. At least a first word from the identified heading selections can be extracted and a heading grammar automatically can be generated by including each extracted word of the identified heading selections within the heading grammar.

17 Claims, 2 Drawing Sheets

AUTOMATIC GENERATION OF EFFICIENT GRAMMAR FOR HEADING SELECTION

BACKGROUND OF THE INVENTION

1. Technical Field

This invention relates to the field of speech recognition, and more particularly, to the generation of a grammar for recognizing heading selections.

2. Description of the Related Art

A conventional speech recognition system (SRS) utilizes one or more grammars to specify allowable, recognizable words and language structure when converting user speech to text. A general purpose SRS designed to recognize a large number of words typically relies upon one or more large grammars. The grammars tend to be large since each word or phrase that is to be recognized by the SRS must be specified within the grammar. The use of such large and inclusive grammars, however, can require a significant amount of processing power and memory, often surpassing the amount required by a SRS using a smaller, more concise grammar. Moreover, the use of a large grammar can lead to reduced speech recognition accuracy. Accordingly, when possible, smaller, more concise grammars can be beneficial to overall SRS performance and efficiency.

In some cases, a SRS need only recognize particular types of objects, for example where a user selects from multiple choices through a speech interface. In such cases, keyword grammars can be used to provide a smaller and more concise alternative to conventional grammars. Still, keyword grammars often are created by generating all possible keyword combinations and including the keyword combinations within the grammar. Despite being smaller than conventional grammars, keyword grammars generated in this manner can be larger than required to accurately and efficiently decode user speech.

SUMMARY OF THE INVENTION

The invention disclosed herein concerns a method and a system for generating a grammar for use in recognizing or decoding a particular class of user speech. More specifically, the present invention provides for the automatic generation of a grammar suited to process user speech specifying headings. Headings can include, for example, a text word or phrase specifying the title or content of an associated story, article, news item, electronic document, or the like. In accordance with the inventive arrangements disclosed herein, a grammar can be generated using the first "n" words from each heading within a set of headings. The resulting heading grammar can, in most cases, unambiguously identify a user desired heading. Notably, the resulting heading grammar typically is smaller than a grammar generated by including all possible word or keyword combinations from a set of headings. The reduced size of the heading grammar can increase speech recognition accuracy while also reducing the time needed to decode user speech. Moreover, the heading grammar disclosed herein can be generated automatically and dynamically responsive to particular events.

One aspect of the present invention can include a method of generating a grammar for recognizing headings in a speech recognition system. The method can include determining one or more selections within a data store to be heading selections, and identifying, within the data store, at least one heading selection associated with a content item. At least a first word can be extracted from each identified heading selection. Alternatively, two words can be extracted from each identified heading selection. Still, it should be appreciated that "n" words can be extracted depending upon the particular implementation of the system disclosed herein.

A heading grammar automatically can be generated by including each extracted word of the identified heading selections within the heading grammar. Notably, the heading grammar can be dynamically generated responsive to a user request for at least one content item. Additionally, the heading grammar can be dynamically generated responsive to a presentation of individual ones of the identified heading selections. The identified heading selections can be presented through a speech interface. User speech selecting one of the heading selections can be decoded according to the heading grammar. The user speech can include a first word or a first and second word of one of the heading selections.

Another aspect of the present invention can include a computer-based speech recognition system for recognizing, at least in part, heading selections. The speech recognition system can include a heading grammar which includes at least a first word from each of the heading selections. Each of the heading selections can reference a particular content item.

BRIEF DESCRIPTION OF THE DRAWINGS

There are shown in the drawings embodiments of which are presently preferred, it being understood, however, that the invention is not so limited to the precise arrangements and instrumentalities shown.

DETAILED DESCRIPTION OF THE INVENTION

The invention disclosed herein concerns a method and a system for generating a grammar for use in recognizing or decoding a particular class of user speech. More specifically, the present invention provides for the automatic generation of a grammar suited to process user speech specifying text content such as headings. The term heading, as used herein, can refer to a text word or phrase specifying the title, headline, content description or name of an associated book, chapter, sub-part of a larger work, story, article, news item, other electronic content, and the like (hereinafter "content items"). A heading further can include one or more special purpose symbols, characters, letters, or numbers. Accordingly, the term "word" can include text words, as well as individual special symbols, characters, letters, or numbers. In any case, the invention allows users to efficiently select a heading, for example through a speech interface, by speaking one or more words of the user desired heading.

Generally, headings, as a class of speech, share a property which permits the automatic generation of a heading grammar. From a study of headings, it has been determined that large sets of headings, and headlines in particular, are unlikely to contain a common first word. Moreover, headings are even more unlikely to begin with common pairs of words. Thus, a grammar generated using the first "n" words of a set of headings, in most cases, can unambiguously identify a user desired heading. This technique permits users to browse sets of headings, for example through a speech interface, and select particular user desired headings by speaking the first word or words of the heading.

Figure 1:
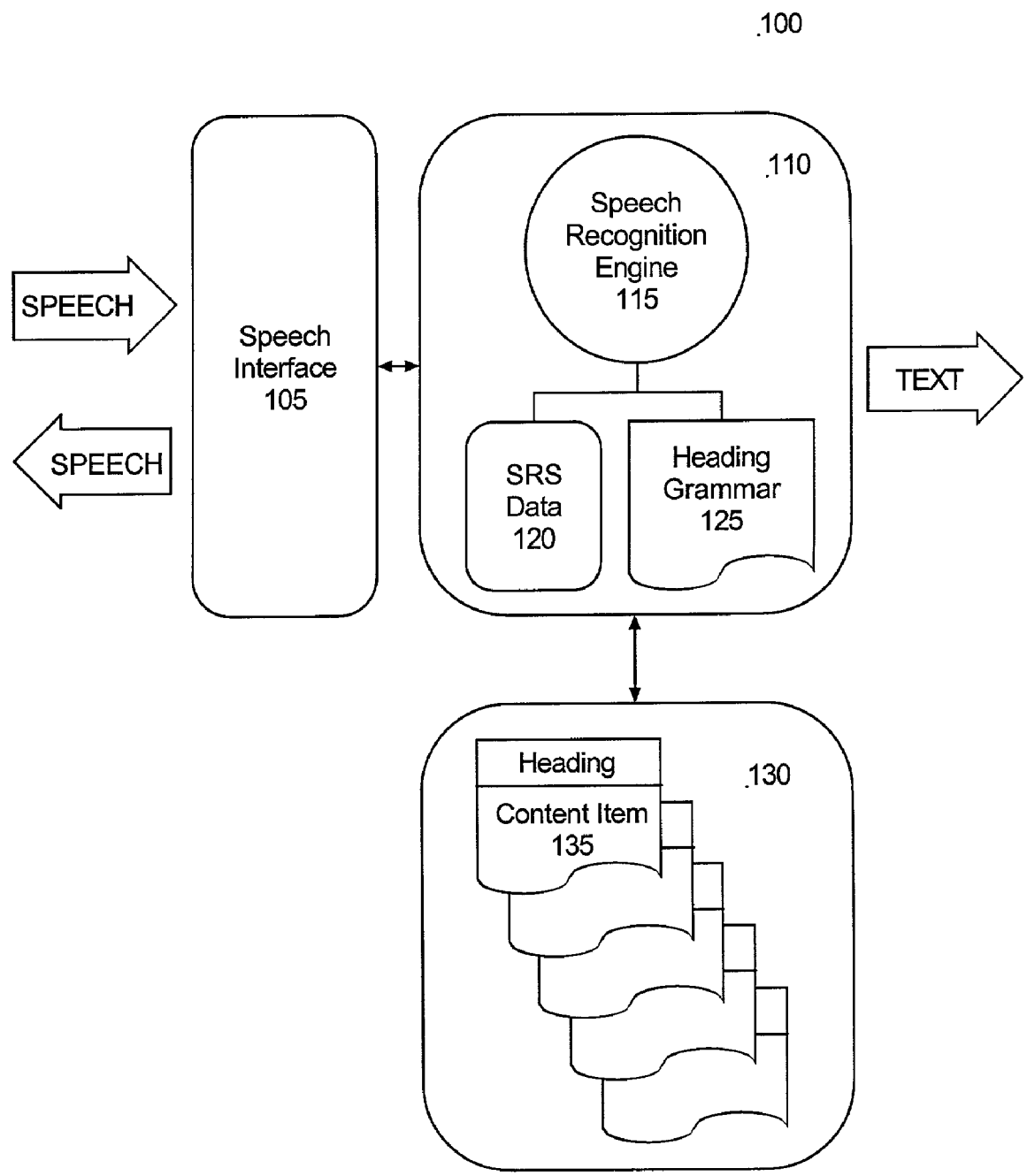
FIG. 1 is a schematic diagram of an exemplary speech processing system.

FIG. 1 is a schematic diagram of an exemplary speech processing system 100. As shown in FIG. 1, the speech processing system 100 can include a speech interface 105, a speech recognition system (SRS) 110, and a data store 130. Each of the components of the speech processing system 100 can be located within a single computer system or can be distributed across one or more computer systems being communicatively linked through a computer communications network. The speech interface 105 can receive user speech and output speech responses. The speech interface 105 can receive user speech in either digital or analog format, and convert the speech into a format which is suitable for use by the SRS 110. Similarly, the speech interface 105 can include a text-to-speech (TTS) system for providing a spoken output in either analog or digital format depending upon the configuration of the speech interface 105. For example, the speech interface can include a voice browser or a speech-only user interface.

The SRS 110 can include a speech recognition engine 115, SRS data 120, and one or more heading grammars 125. As is well known in the art, the speech recognition engine 115 can convert digitized speech to text and provide a text output. For example, the speech recognition engine 115 can perform an acoustic analysis upon the digitized speech to identify one or more potential word candidates. The speech recognition engine 115 further can perform a contextual or linguistic analysis upon the potential word candidates to determine a final text representation of the digitized speech signal. Notably, the SRS 110 further can provide information such as speech menu items, in this case heading selections, and other information to the speech interface 105 for presentation to a user.

The SRS data 120 can include any necessary acoustic and linguistic models, as well as other information used by the speech recognition engine 110 in converting digitized speech to text. For example, the SRS data 120 can include, but is not limited to, a recognizable vocabulary, valid speech command lists, alternative words or text corresponding to recognized words, and the like. The heading grammar 125 can include the first "n" words from a set of headings which are to be presented to a user. The heading grammar 125 can include, for example, the first word, the first two words, the first three words, etc. of each heading within a set of headings to be presented to a user. For example, the SRS 110 can count the first "n" words of each heading to be included in the heading grammar 125. Notably, the heading grammar 125 can be generated automatically by the SRS 110. Moreover, the heading grammar 125 can be generated dynamically, if necessary, responsive to a user request for headings for example.

The data source 130 can include one or more content items 135 or sets of content items. Each of the content items 135 can include a heading portion which can be used as a selection or menu item for identifying the content item 135 through a speech interface. The heading portion, as mentioned, can include one or more words specifying the title or content of an associated content item. Notably, the heading portion can be specified in any of a variety of ways. For example, the heading portion can be specified with a suitable tag using a markup language or can be located at a fixed location within the content item. The invention, however, is not limited by the particular way in which headings are designated or specified. Additionally, although FIG. 1 depicts the data source 130 as including content items 135 having headings contained therein, it should be appreciated that the headings can be stored separately from the associated content items. For example, the headings can be retrieved from various online data stores, can be stored within the SRS data 120, or an additional data store (not shown) such that upon selection of a heading, the corresponding content item can be retrieved from the appropriate data store.

Figure 2:
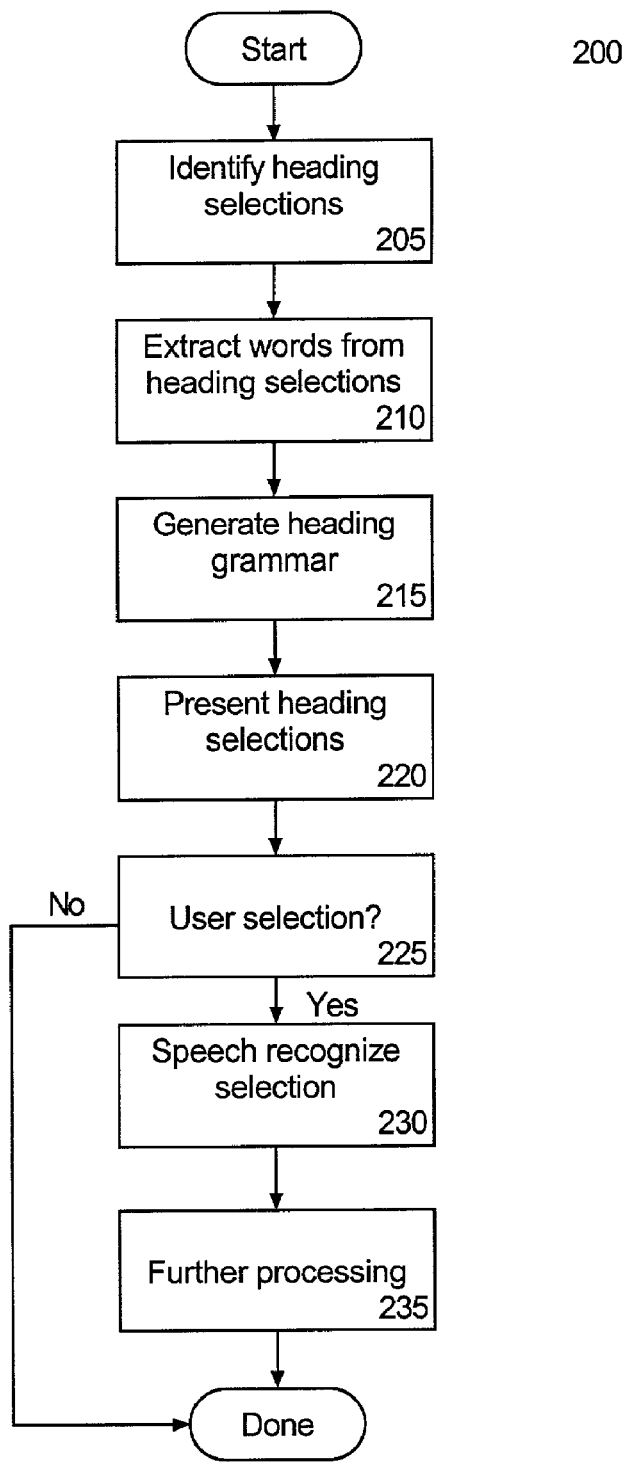
FIG. 2 is a flow chart illustrating a method of generating a grammar for processing user speech specifying headings.

FIG. 2 is a flow chart illustrating a method 200 of generating a grammar for processing user speech specifying headings. The method 200 can begin in a state wherein a user has requested one or more headings. For example, the user can request "top stories of the day" through a speech interface. Users can select this option through experience or by explicit instruction. In any case, the heading grammar can be generated dynamically and automatically responsive to the user request. Still, it should be appreciated that the heading grammar can be generated automatically at particular designated times such as during a system update or synchronization. For example, a heading grammar can be generated after collecting or updating particular content items or a set of content items within a data store.

The method 200 can begin in a state wherein a determination has been made that headings are to be presented to a user. Accordingly, in step 205, one or more headings can be identified. As mentioned, the headings can be designated using an appropriate identifier such as a tag or a particular location within a document. For example, individual headings or each heading within a given set of headings which corresponds to a particular topic such as local news, sports, politics, and the like can be identified. In step 210, the first "n" words of each identified heading can be extracted. Although one or more words can be extracted from the identified heading, in one embodiment of the present invention, the first 2 words from each identified heading are extracted. Still, it should be appreciated that any number of words can be extracted so long as the number of words extracted from a heading is less than the total number of words of that heading.

In step 215, a heading grammar can be generated. The heading grammar can include the extracted words from step 210. Notably, as determined by the study of headings, a grammar constructed from the first word or first two words of a set of headings can, in most cases, unambiguously identify each heading within the set of headings. In another embodiment of the present invention, the heading grammar can be generated as each heading selection is presented to a user. As a heading selection is presented, the first "n" words of the presented heading can be extracted and included within the heading grammar. For example, the first "n" words of a heading can be included within the heading grammar either before, during, or immediately after that individual heading selection is presented to the user.

In step 220, the headings identified in step 205 can be presented to the user. If the user makes a selection in step 225, for example by speaking the first "n" words of the desired heading, the method can continue to step 230. If not, the method can end. In step 230, the users selection, or speech, can be recognized using the heading grammar. After completion of step 230, the method can continue to step 235 for further processing. Depending upon the particular system implementation, the content item corresponding to the user selected heading can be presented to the user through the speech interface or can be provided to a back-end application specific system. Still, the speech recognized user selection can be used for any of a variety of other processing functions.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of generating a grammar for recognizing headings in a speech recognition system comprising:
   determining that said at least one heading section is to be presented to a user;
   based on the determination, automatically identifying, within a data store, at least one heading selection associated with a content item, wherein each of said at least one heading selection is able to be used as a selection item for identifying the content item through a speech interface;
   automatically extracting at least a first word from each said identified heading selection, wherein said extracted at least a first word includes "n" words of the heading section, and wherein "n" is less than the total number of words in the heading selection;
   automatically generating a heading grammar by including each said extracted word of said identified heading selections within said heading grammar;
   presenting said identified headings to the user; and
   speech recognizing a spoken user selection using said heading grammar.

2. The method of claim 1, wherein the beading selections are specified within the content item by an identifying tag of a markup language.

3. The method of claim 1, wherein said automatic generating step dynamically generates said heading grammar responsive to a user request for at least one content item.

4. The method of claim 1, wherein said automatic generating step dynamically generates said heading grammar responsive to a presentation of individual ones of said identified heading selections.

5. The method of claim 1, wherein "n" is a number between one and two.

6. The method of claim 1, further comprising:
   presenting said identified heading selections through a speech interface; and
   decoding user speech selecting one of said heading selections according to said heading grammar.

7. The method of claim 6, wherein said user speech comprises a first word of one of said heading selections.

8. The method of claim 1, wherein said heading grammars are automatically generated at designated times and occur during at least one of a system update action and a system synchronization action.

9. A computer-based speech processing system for recognizing, at least in part, heading selections, said speech processing system comprising:
   a speech interface;
   a data store in communication with said speech interface; and
   a speech recognition engine in communication with said data story and speech interface,
   wherein said speech recognition system is configured to automatically generate a heading grammar comprising at least a first word from each of said heading selections, wherein said at least a first word includes "n" words of the heading section, and wherein "n" is less tan the total number of words in the heading selection, wherein each of said heading selections references a particular content item, and wherein spoken user selections are speech recognized using said automatically generated heading grammar.

10. A machine-readable storage, having stored thereon a computer program having a plurality of code sections executable by a machine for causing the machine to perform the steps of:
    determining that said at least one heading section is to be presented to a user;
    automatically identifying, within a data store, at least one heading selection associated with a content item, wherein each of said at least one heading selection is able to be used as a selection item for identifying the content item through a speech interface;
    automatically extracting at least a first word from each said identified heading selection, wherein said extracted at least a first word includes "n" words of the heading section, and wherein "n" is less than the total number of words in the heading selection;
    automatically generating a heading grammar by including each said extracted word of said identified heading selections within said heading grammar;
    presenting said identified headings to the user; and
    speech recognizing a spoken user selection using said heading grammar.

11. The machine-readable storage of claim 10, wherein the heading selections are specified within the content item by an identifying tag of a markup language.

12. The machine-readable storage of claim 10, wherein said automatic generating step dynamically generates said heading grammar responsive to a user request for at least one content item.

13. The machine-readable storage of claim 10, wherein said automatic generating step dynamically generates said heading grammar responsive to a presentation of individual ones of said identified heading selections.

14. The machine-readable storage of claim 10, wherein "n" is a number between one and two.

15. The machine-readable storage of claim 10, further comprising:
    presenting said identified heading selections through a speech interface; and decoding user speech selecting one of said heading selections according to said heading grammar.

16. The machine-readable storage of claim 15, wherein said user speech comprises a first word of one of said heading sections.

17. The machine-readable storage of claim 10, wherein said heading grammars are automatically generated at designated times and occur during at least one of a system update action and a system synchronization action.

* * * * *